US012617400B2

(12) United States Patent
Akella

(10) Patent No.: US 12,617,400 B2
(45) Date of Patent: May 5, 2026

(54) SYSTEM AND METHOD FOR DETERMINING A TARGET VEHICLE SPEED

(71) Applicant: Zoox, Inc., Foster City, CA (US)

(72) Inventor: Abishek Krishna Akella, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 673 days.

(21) Appl. No.: 16/457,643

(22) Filed: Jun. 28, 2019

(65) Prior Publication Data

US 2020/0406894 A1    Dec. 31, 2020

(51) Int. Cl.
| | |
|---|---|
| *B60W 30/16* | (2020.01) |
| *B60K 31/00* | (2006.01) |
| *B60T 7/22* | (2006.01) |
| *B60W 40/105* | (2012.01) |
| *F16H 59/50* | (2006.01) |
| *G01S 13/524* | (2006.01) |

(Continued)

(52) U.S. Cl.
CPC ....... *B60W 30/162* (2013.01); *B60K 31/0008* (2013.01); *B60K 31/0066* (2013.01); *B60T 7/22* (2013.01); *B60W 40/105* (2013.01); *G01S 13/5242* (2013.01); *G01S 13/60* (2013.01); *G01S 13/865* (2013.01); *B60W 2552/20* (2020.02); *F16H 2059/506* (2013.01)

(58) Field of Classification Search
CPC ............. B60W 30/162; B60W 40/105; B60W 2552/20; B60T 7/22; G01S 13/5242; G01S 13/865; G01S 13/60; B60K 31/0066; B60K 31/0008; F16H 2059/506; G08G 1/052
See application file for complete search history.

(56) References Cited

U.S. PATENT DOCUMENTS

| | | | |
|---|---|---|---|
| 9,165,477 B2 | 10/2015 | Wilson | |
| 10,019,011 B1 | 7/2018 | Green et al. | |
| 10,311,731 B1 * | 6/2019 | Li | G08G 1/146 |

(Continued)

FOREIGN PATENT DOCUMENTS

| | | |
|---|---|---|
| CN | 109597317 A | 4/2019 |
| EP | 3318456 A1 | 5/2018 |

(Continued)

OTHER PUBLICATIONS

International Search Report and Written Opinion mailed Sep. 17, 2020, Patent Application No. PCT/US2020/039993, 8 pages.

(Continued)

*Primary Examiner* — Abby J Flynn
*Assistant Examiner* — Kyle J Kingsland
(74) *Attorney, Agent, or Firm* — EIP US LLP

(57) ABSTRACT

A machine-learned model is trained using human driving data to determine a desired vehicle speed based from a set of driving-environment characteristics. An autonomous-vehicle control system obtains, from cameras, sensors, services, and data sources, a variety of sensor data. The sensor data is used to determine a set of characteristics for the driving-environment for the autonomous vehicle. Using the machine-learned model, the autonomous-vehicle control system determines a human-like desired speed for the autonomous vehicle based at least in part on the determined characteristics of the driving-environment.

18 Claims, 7 Drawing Sheets

(51) Int. Cl.
  _G01S 13/60_     (2006.01)
  _G01S 13/86_     (2006.01)

(56)                References Cited

U.S. PATENT DOCUMENTS

| | | | |
|---|---|---|---|
| 2017/0022488 A1 | 1/2017 | Bermudez et al. | |
| 2018/0154899 A1 | 6/2018 | Tiwari et al. | |
| 2018/0164119 A1 | 6/2018 | Becker | |
| 2019/0152490 A1 | 5/2019 | An et al. | |
| 2019/0329768 A1* | 10/2019 | Shalev-Shwartz | ...................... |
| | | | B60W 30/0956 |
| 2020/0062255 A1* | 2/2020 | Fernando | ............ B60W 30/188 |
| 2020/0114926 A1* | 4/2020 | Liu | ....................... G06N 3/0445 |
| 2020/0139989 A1* | 5/2020 | Xu | ......................... B60W 10/04 |
| 2020/0209867 A1* | 7/2020 | Valois | .................... G01S 13/865 |
| 2020/0385007 A1* | 12/2020 | Bucht | .................... B60W 40/09 |

FOREIGN PATENT DOCUMENTS

| | | | |
|---|---|---|---|
| EP | 3495219 A1 | 6/2019 | |
| JP | 2006251888 A | 9/2006 | |
| JP | 2016203894 A | 12/2016 | |
| JP | 2017128191 A | 7/2017 | |
| JP | 2018025898 A | 2/2018 | |
| JP | 2018510373 A | 4/2018 | |
| JP | 2018087004 A | 6/2018 | |
| JP | 2018151287 A | 9/2018 | |
| JP | 2018154304 A | 10/2018 | |
| JP | 2019034648 A | 3/2019 | |
| JP | 2019084936 A | 6/2019 | |
| RU | 2016130094 A | 1/2018 | |
| WO | 2017022488 A1 | 2/2017 | |
| WO | 2018132607 A2 | 7/2018 | |
| WO | 2018132608 A2 | 7/2018 | |
| WO | 2018147872 A1 | 8/2018 | |
| WO | 2018220851 A1 | 12/2018 | |
| WO | 2019058460 A1 | 3/2019 | |

OTHER PUBLICATIONS

Silva, W.A., et al., "Occlusion Aware Planning," U.S. Appl. No. 16/011,436, filed Jun. 18, 2018.

Hong, X.J., et al., "Trajectory Prediction Based On Top-Down Scenes," U.S. Appl. No. 16/151,607, filed Oct. 4, 2018.

Japan Patent Office, "Notice of Reasons for Refusal" in Application No. 2021-576550, Sep. 27, 2023, 8 pages.

China National Intellectual Property Administration, "Notification of the First Office Action" in Application No. 202080047338.6, Apr. 12, 2023, 16 pages.

European Patent Office, "Search Report" in application No. 20832740.3—1012, Aug. 3, 2023, 10 pages.

Japan Patent Office, "Notice of Reasons for Refusal" in Application No. 2021-576550, Mar. 15, 2023, 5 pages.

\* cited by examiner

300

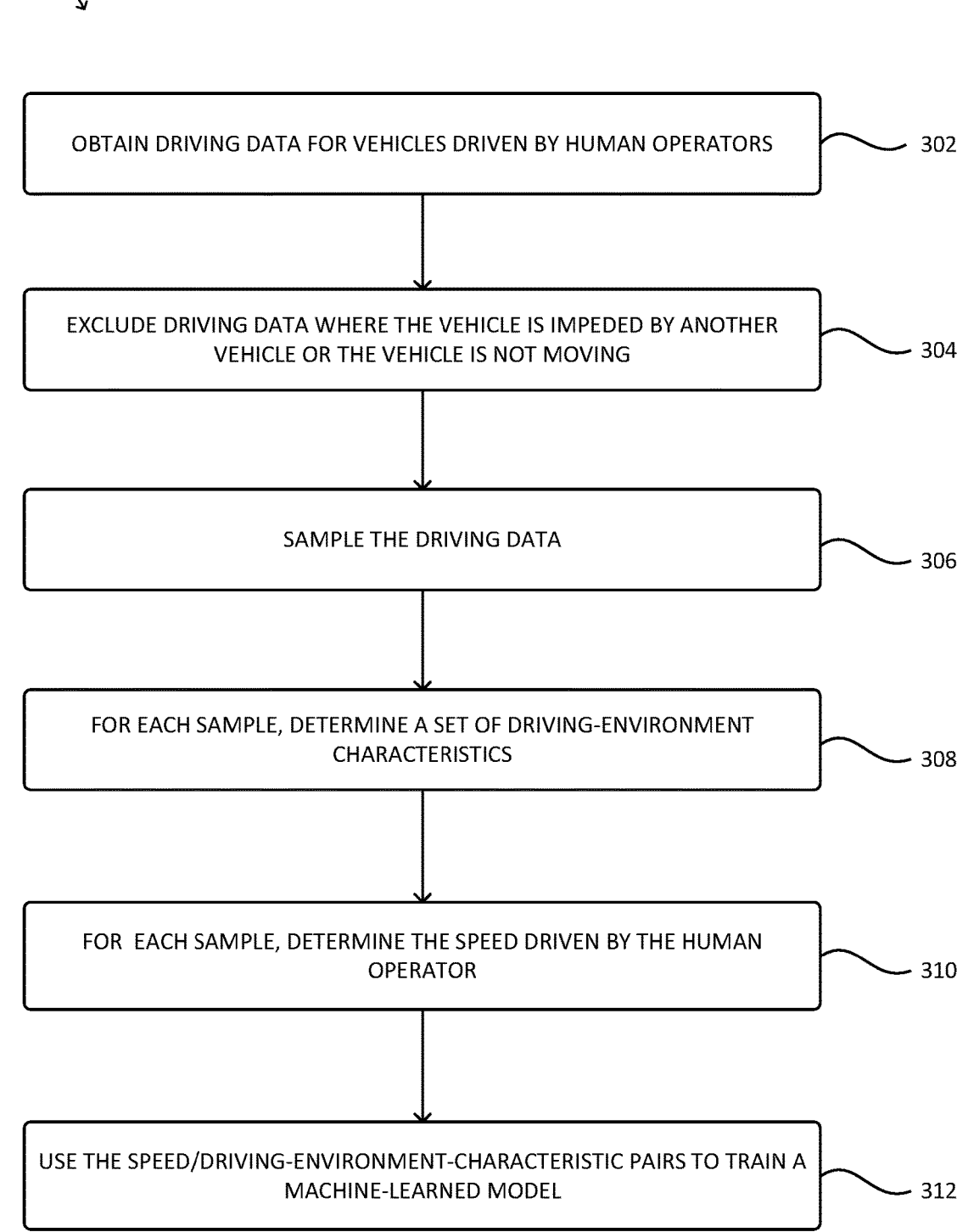

OBTAIN DRIVING DATA FOR VEHICLES DRIVEN BY HUMAN OPERATORS — 302

EXCLUDE DRIVING DATA WHERE THE VEHICLE IS IMPEDED BY ANOTHER VEHICLE OR THE VEHICLE IS NOT MOVING — 304

SAMPLE THE DRIVING DATA — 306

FOR EACH SAMPLE, DETERMINE A SET OF DRIVING-ENVIRONMENT CHARACTERISTICS — 308

FOR EACH SAMPLE, DETERMINE THE SPEED DRIVEN BY THE HUMAN OPERATOR — 310

USE THE SPEED/DRIVING-ENVIRONMENT-CHARACTERISTIC PAIRS TO TRAIN A MACHINE-LEARNED MODEL — 312

FIG. 3

500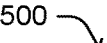

```
┌──────────────────────────────────────────────────────────────────┐
│   OBTAIN SENSOR DATA FROM SENSORS OF THE AUTONOMOUS VEHICLE         │───── 502
└──────────────────────────────────────────────────────────────────┘
                                  │
                                  ▼
┌──────────────────────────────────────────────────────────────────┐
│   DETERMINE A SET OF DRIVING-ENVIRONMENT CHARACTERISTICS FROM THE   │───── 504
│                         SENSOR DATA                                 │
└──────────────────────────────────────────────────────────────────┘
                                  │
                                  ▼
┌──────────────────────────────────────────────────────────────────┐
│   PROVIDE THE DRIVING-ENVIRONMENT CHARACTERISTICS TO A MACHINE-     │───── 506
│   LEARNED MODEL TO PRODUCE A DESIRED VEHICLE SPEED                  │
└──────────────────────────────────────────────────────────────────┘
                                  │
                                  ▼
┌──────────────────────────────────────────────────────────────────┐
│   DETERMINE A TARGET VEHICLE SPEED BASED ON THE DESIRED VEHICLE     │───── 508
│   SPEED, THE CURRENT VEHICLE SPEED, AND A HEURISTIC SPEED LIMIT     │
└──────────────────────────────────────────────────────────────────┘
                                  │
                                  ▼
┌──────────────────────────────────────────────────────────────────┐
│         BRING THE VEHICLE TO THE TARGET VEHICLE SPEED               │───── 510
└──────────────────────────────────────────────────────────────────┘
```

FIG. 5

600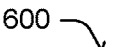

SET TARGET SPEED TO A DESIRED SPEED
GENERATED USING A MACHINE-LEARNED
MODEL

602

TARGET SPEED GREATER THAN
STATUTORY SPEED LIMIT?

604

—YES—

LIMIT TARGET SPEED TO
STATUTORY SPEED LIMIT

606

NO

TARGET SPEED GREATER THAN
VEHICLE SPEED CAPABILITY?

608

—YES—

LIMIT TARGET SPEED TO
VEHICLE CAPABILITY

610

NO

TARGET SPEED GREATER THAN
HEURISTIC SPEED LIMIT?

612

—YES—

LIMIT TARGET SPEED TO
HEURISTIC SPEED LIMIT

614

NO

CONTROL VEHICLE IN ACCORDANCE WITH THE
TARGET SPEED

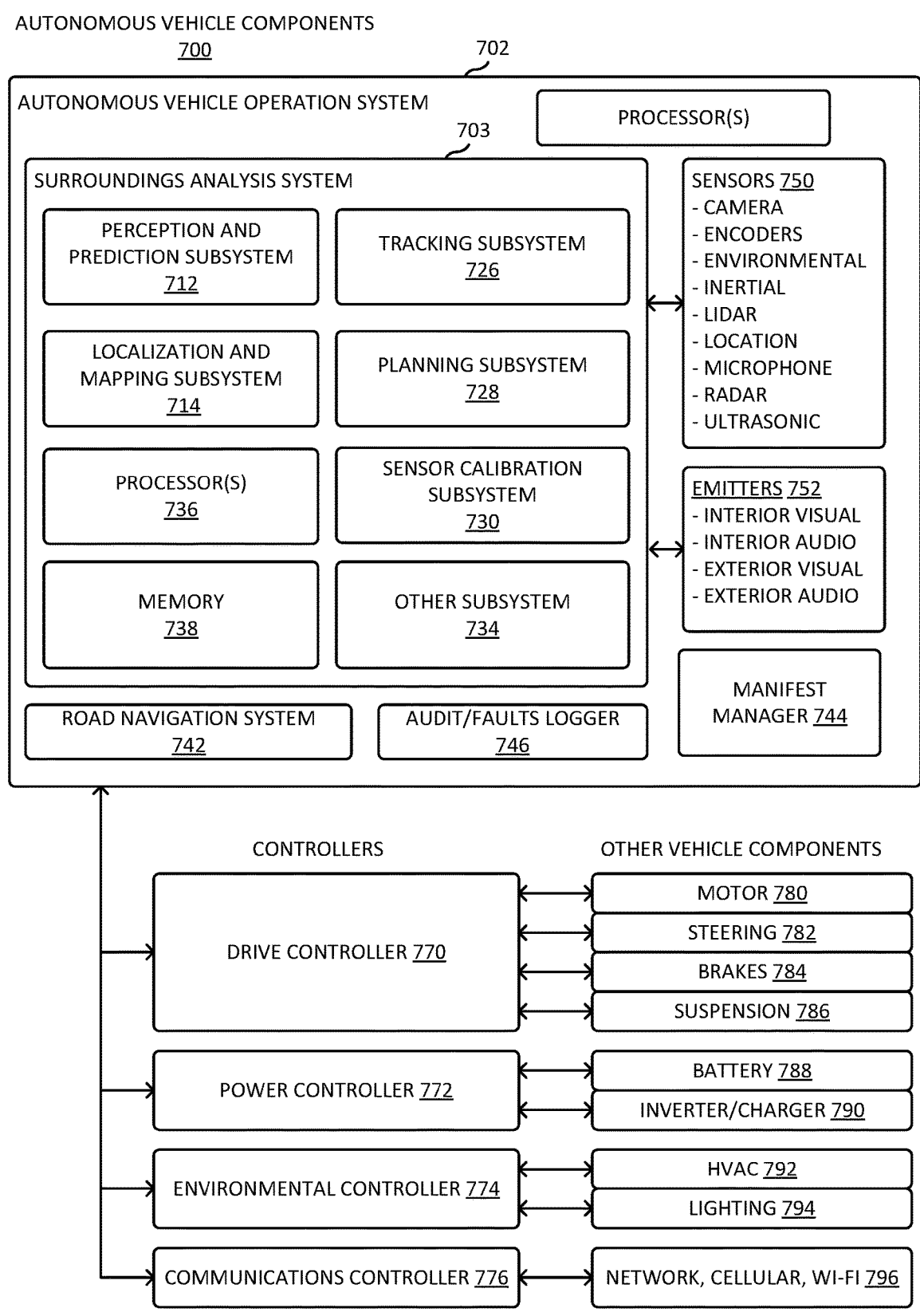

AUTONOMOUS VEHICLE COMPONENTS
700                                                    702

AUTONOMOUS VEHICLE OPERATION SYSTEM

703                                          PROCESSOR(S)

SURROUNDINGS ANALYSIS SYSTEM

| PERCEPTION AND PREDICTION SUBSYSTEM 712 | TRACKING SUBSYSTEM 726 |

| LOCALIZATION AND MAPPING SUBSYSTEM 714 | PLANNING SUBSYSTEM 728 |

| PROCESSOR(S) 736 | SENSOR CALIBRATION SUBSYSTEM 730 |

| MEMORY 738 | OTHER SUBSYSTEM 734 |

SENSORS 750
- CAMERA
- ENCODERS
- ENVIRONMENTAL
- INERTIAL
- LIDAR
- LOCATION
- MICROPHONE
- RADAR
- ULTRASONIC

EMITTERS 752
- INTERIOR VISUAL
- INTERIOR AUDIO
- EXTERIOR VISUAL
- EXTERIOR AUDIO

MANIFEST MANAGER 744

| ROAD NAVIGATION SYSTEM 742 | AUDIT/FAULTS LOGGER 746 |

CONTROLLERS                          OTHER VEHICLE COMPONENTS

DRIVE CONTROLLER 770

| MOTOR 780 |
| STEERING 782 |
| BRAKES 784 |
| SUSPENSION 786 |

POWER CONTROLLER 772

| BATTERY 788 |
| INVERTER/CHARGER 790 |

ENVIRONMENTAL CONTROLLER 774

| HVAC 792 |
| LIGHTING 794 |

COMMUNICATIONS CONTROLLER 776          NETWORK, CELLULAR, WI-FI 796

FIG. 7

SYSTEM AND METHOD FOR DETERMINING A TARGET VEHICLE SPEED

BACKGROUND

The development of autonomous vehicles has great potential to improve people's lives. Early examples provided speed control that maintained vehicle speed at a set velocity. Later implementations added visual, laser, or radar sensors that allowed cruise control systems to maintain distance from traffic ahead of the vehicle being controlled. Still later implementations added lane departure alert systems and even lane keeping systems to aid in steering the vehicle. Many companies and individuals are working on fully autonomous systems in the hope that vehicles can be operated with minimal and perhaps no human intervention. Although the economic benefits of such a system are enticing, no major manufacturer has successfully deployed a fully autonomous vehicle to the mass market. The autonomous driving problem has proven itself to be far more complex and nuanced than a simple problem of applied physics. For example, any autonomous vehicle must interact with many other vehicles being operated by human operators making human decisions. Therefore, it is important that any autonomous driving system operate in a way that appropriately interacts with the occupants of the vehicle and with the operators of other vehicles.

BRIEF DESCRIPTION OF THE DRAWINGS

Various techniques will be described with reference to the drawings, in which:

FIG. 3 illustrates an example of a process to generate a machine-learned model that outputs a desired vehicle speed given a set of driving-environment characteristics;

FIG. 5 illustrates an example of a process that, as a result of being performed by an autonomous-vehicle control system, controls a vehicle speed in accordance with a desired speed produced by a machine-learned model;

FIG. 6 illustrates an example of a process that, as a result of being performed by an autonomous-vehicle control system, determines a preferred vehicle speed produced based at least in part on a speed produced by a machine-learned model; and FIG. 7 illustrates a system in which various techniques described herein can be implemented.

DETAILED DESCRIPTION

Figure 1:
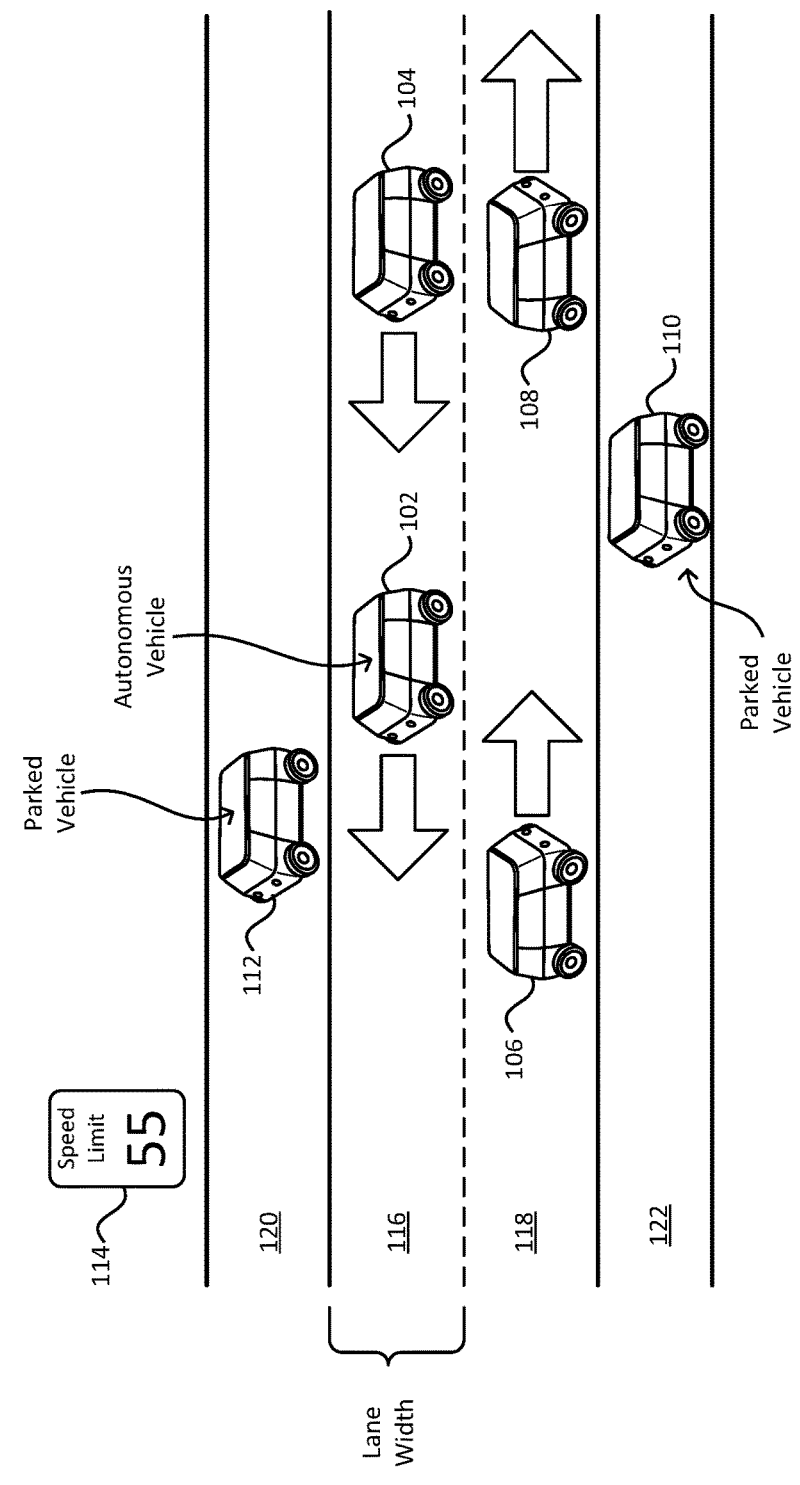
FIG. 1 illustrates an example of an autonomous vehicle operating in a driving environment.

The present document describes a system that determines a desired speed for an autonomous vehicle using a machine-learned model trained using human driving examples. In various examples, the machine-learned model is a neural network. The human driving examples are used to train the neural network by identifying various characteristics of the driving environment and then providing those characteristics along with the speed driven by the human operator to the neural network. In one example, the characteristics include lane width, posted speed limit, oncoming traffic speed, vertical and horizontal curvature of the road, the speed of other nearby vehicles, and visibility. After training, in some examples, the trained state of the neural network is a machine-learned model that can be used to determine an appropriate speed for the autonomous vehicle that is similar to the speed a human operator would select under similar conditions.

In one example, an autonomous vehicle includes a vehicle-control system. The vehicle-control system is a computer system that includes one or more processors and memory that stores executable instructions that, as a result of being executed by the one or more processors, causes the system to control the vehicle. The vehicle-control system includes various servos that allow control of the steering, throttle, and other vehicle systems as well as a set of sensors such as cameras, radar, a global positioning receiver and navigational database, attitude sensors, and accelerometers that collect sensor data. In one example, sensor data collected by the vehicle-control system is used to estimate a set of characteristics that match the characteristics represented in the training data. The estimated set of characteristics is provided to the machine-learned model, and the machine-learned model produces a desired speed based on the characteristics. In some examples, the machine-learned model is trained from sensor data, and the resulting machine-learned model produces a desired speed from sensor data acquired by the vehicle-control system.

In various examples, additional characteristics represented in the training data may be provided to the vehicle-control system by other services. For example, map data, weather information, temperature information, time of day, and date of year may be present in the training data and used by the vehicle-control system to produce the desired speed. In another example, vehicle characteristics such as vehicle type, vehicle weight, vehicle payload, towing load, horsepower, battery temperature, and coolant temperature may be included in the characteristics. In yet another example, road condition (roughness and/or surface type), the presence of construction signs or signals, power grid failures resulting in failed traffic signals, the presence of snow or ice or other material on the roadway, when present in the training data, can be used with the vehicle-control system to produce a desired vehicle speed.

One advantage of the vehicle-speed learning system described herein is that the desired speed calculated by the machine-learned model is one that human operators are able to anticipate. This aids in vehicle safety by allowing autonomous control that approximates foreseeable human-like behavior. Another advantage is that the vehicle-speed learning system described herein is able to combine many driving-environment characteristics to produce a safe speed given the overall context. The desired speed determined by the machine-learned model may differ substantially from the desired speed calculated by a physical model that takes into consideration only the limitations of statutory speed limit, the physical limits of the vehicle, and the controlling capabilities of the vehicle-control system. For example, a capable vehicle control system may determine that it is able to navigate a narrow curved road in the fog perfectly safely using radar and advanced sensors at the posted speed limit, but a human riding in such a vehicle might be extremely uncomfortable since they are unable to see under those conditions.

As one skilled in the art will appreciate in light of this disclosure, certain examples may be capable of achieving certain advantages, including some or all of the following: (1) more accurate determination of target vehicle speed compensates for combinations of driving-environment characteristics, (2) improved speed choices that are more human-like, allowing for improved interaction with human-operated vehicles; (3) improved coordination with human copilots; and (4) improved safety.

FIG. 1 illustrates an example of an autonomous vehicle operating in a driving environment. A driving environment 100 includes an autonomous vehicle 102 operating on a roadway with a number of other vehicles. In various examples, the autonomous vehicle 102 can be an automobile, a truck, a forklift, a tractor, an agricultural vehicle. In one example, the autonomous vehicle 102 is a semi-autonomous vehicle with driver-assist features such as adaptive cruise control and/or lane-keeping features. The autonomous vehicle 102 includes a vehicle-control system. The vehicle-control system includes a processor and memory containing executable instructions that, as a result of being executed, cause the vehicle-control system to obtain sensor data from one or more sensors on the vehicle, process the sensor data to determine a set of driving-environment characteristics, and then control the vehicle based at least in part on those driving-environment characteristics. In various examples, driving-environment characteristics can include the width of the roadway on which the vehicle is traveling, the position and relative speed of other vehicles around the autonomous vehicle, vertical and horizontal curvature of the roadway, as well as prevailing roadway friction, visibility, and sensory acuity.

In at least some examples, information regarding visibility of the scene from all sensors may be determined (e.g., by building an occlusion map). Such occlusion information may be used as an input to the machine learned model to further determine a suggested, or desired, speed. Examples of such occlusion grid generation can be found in U.S. patent application Ser. No. 16/011,436 filed on Jun. 18, 2018 entitled "OCCLUSION AWARE PLANNING," which is incorporated herein by reference.

In one implementation, other vehicles, pedestrians, bicycles, or objects are tracked using sensors (e.g., video obtained via cameras on the autonomous vehicle). In one example, objects may be tracked using video images captured using cameras on the autonomous vehicle. The data is processed by the vehicle control system to identify extents or bounding boxes associated with each recognized object, in addition to other environmental data (velocities, accelerations, etc.). Map data may also be received. Such information may be encoded into a multi-channel image (e.g., wherein each "image" corresponds to different environmental data—e.g., one channel encodes extents of bounding boxes, one channel encodes velocities, one for map data, and the like). Additional information can be found in U.S. patent application Ser. No. 16/151,607 filed on Oct. 4, 2018 entitled "TRAJECTORY PREDICTION BASED ON TOP-DOWN SCENES," the entire contents of which are incorporated herein by reference.

In the example illustrated in FIG. 1, the autonomous vehicle 102 is traveling along a first lane 116 of a two-way street and being followed by a first vehicle 104. A second vehicle 106 and a third vehicle 108 are traveling in a second lane 118 in approximately the opposite direction of the autonomous vehicle 102. The roadway includes a first shoulder area 120 and a second shoulder area 122. A first parked vehicle 110 is parked in the second shoulder area 122 and a second parked vehicle 112 is parked in the first shoulder area 120. In the illustrated example, the prevailing speed limit for the roadway is 55 miles an hour and is indicated on a road sign 114.

In an example, the vehicle-control system controls the autonomous vehicle 102 in accordance with the desired speed calculated based on a set of driving-environment characteristics and heuristic measurements, statutory limits, and vehicle dynamic limits. In an example, a statutory limit may be determined by a camera on the autonomous vehicle 102 viewing the road sign 114 and reading the speed limit. In another example, a statutory limit may be determined from a database of road information either stored on the vehicle-control system or accessible remotely via wireless network connection (e.g., as may be available from an encoding in a map). Vehicle dynamic limits may, in some examples, be determined based on vehicle type, ambient temperature, transmission temperature, coolant temperature, or estimated horsepower output. In some examples, a heuristic limit is determined based on estimated vehicle traction, road curvature, and sensor acuity.

In some instances, the vehicle-control system includes a machine-learned model that is used to generate a desired vehicle speed. The machine-learned model is trained using data of human drivers driving vehicles under various driving-environment characteristics and various speeds. The machine-learned model learns to produce a desired speed given a set of driving-environment characteristics. Based on the training data, the speed produced by the machine-trained model represents a speed what would be driven by a human operator. This speed may be different than, say, a statutory speed, or a speed determined via a heuristic algorithm. In at least some examples, determining a desired speed based on such a machine learned model may comprise reasoning about additional information not easily encoded into such a machine. In some examples, sensor data is transformed into a set of driving-environment characteristics, and the characteristics are input into the machine-learned model to produce the target vehicle speed. By pre-processing the sensor data into driving-environment characteristics, the size and/or depth of the neural network required are reduced. This may, in various implementations, reduce the computing resource footprint of the system and reduce the training burden.

In an example, as the autonomous vehicle 102 is operated by the vehicle-control system, the vehicle-control system obtains sensory data from vehicle sensors. Vehicle sensors may, in various examples, include digital cameras, ultrasonic sensors, light detection and ranging ("LIDAR") sensors, RADAR sensors, temperature sensors, humidity sensors, moisture sensors, accelerometers, engine sensors, and vehicle status sensors. The vehicle-control system synthesizes the sensory data into a set of driving-environment characteristics that correspond to the inputs of the machine-learned model. Then, using the driving-environment characteristics, the vehicle-control system determines a desired speed based on the machine-learned model. Driving-environment characteristics may include such characteristics as the lane width, lane curvature, number of cars traveling in the same direction, the relative speed of cars traveling in the same direction, the number of cars traveling in the opposite direction, the number of parked cars, the posted speed limit, the prevailing visibility, the amount of daylight, and the presence of pedestrians, bicycles, or other vehicles.

In some examples, the speed generated by the machine-learned model is one of several candidate speed limits used by the vehicle-control system to determine the final desired speed for the vehicle. In some examples, changes in vehicle speed are determined by filtering the current speed with a low-pass filter. In some examples, a Schmitt trigger or hysteresis filter is used to prevent 'hunting,' or frequent small shifts in vehicle speed. In such examples, the desired speed output by the model may be compared to a most recently requested desired speed to ensure that any changes are within a threshold amount.

Figure 2:
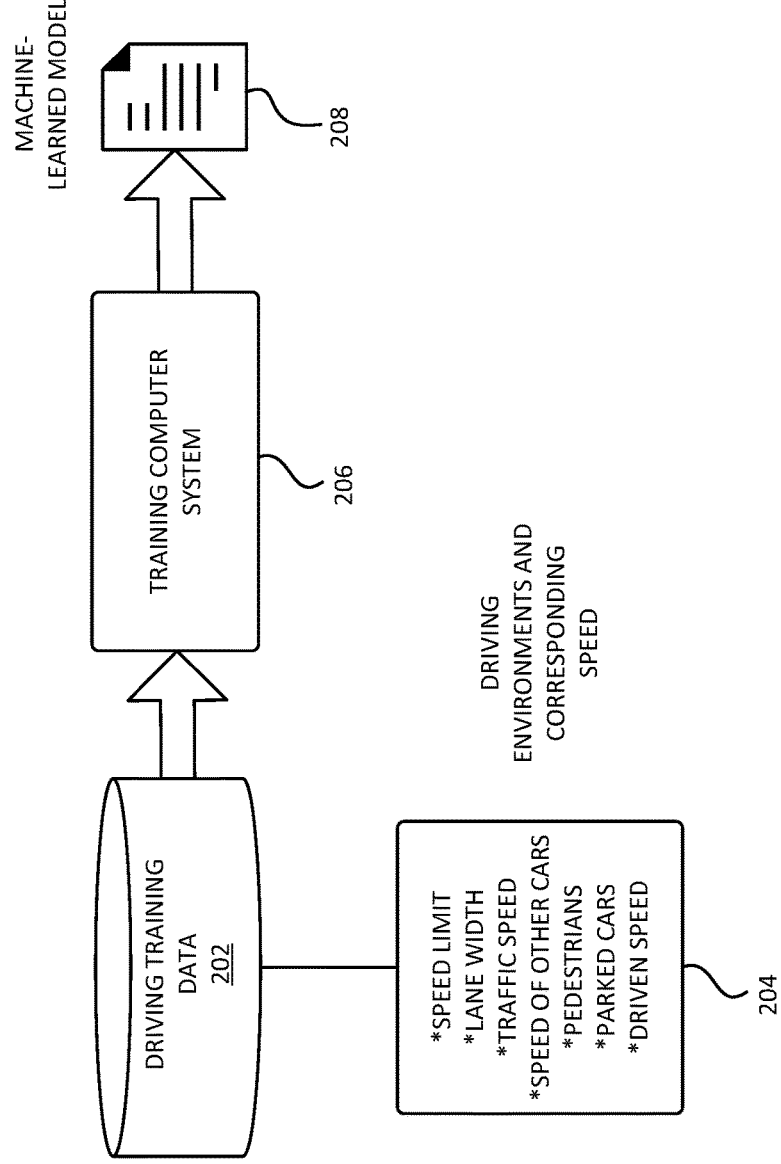
FIG. 2 illustrates an example of a system that generates a machine-learned model for determining a desired speed based on human driving data.

FIG. 2 illustrates an example of a system 200 that generates a machine-learned model for determining a desired speed based on human driving data, in an example. A training computer system 206 uses a set of driving training data 202 to produce a machine-learned model that generates a desired speed for a vehicle given a set of driving-environment characteristics that correspond to a set of driving-environment characteristics 204 that are present in the driving training data 202. In one example, the driving training data 202 includes information such as the statutory speed limit, the lane width, traffic speed, speed of cars going the same direction as the car being driven, speed of cars traveling in the opposite direction, the location of pedestrians, and the location of parked cars. At least some such driving training data 202 may be determined based at least in part on a perception system associated with the corresponding vehicle (entity locations, speeds, extents, etc.), as well as data encoded in map data associated with a position of the vehicle determined by a localization system (e.g., lane widths, speed limits, etc.). In some examples, additional driving-environment characteristics may be present in the training data and used to generate a speed such as the presence of emergency vehicles, and adverse weather conditions such as fog, rain, snow, or icy conditions. In some examples, the driving training data 202 includes vehicle status information such as traction data, vehicle type, horsepower, gross weight, towing data, engine temperature, transmission temperature, time of day, day of week, month of year, battery level, and battery temperature. For each set of driving-environment characteristics in the driving training data 202, an associated vehicle speed is present. In many examples, the driving training data 202 is generated by vehicles or vehicle simulators operated by human beings, and the vehicle speed in the driving training data 202 is the speed driven by the human operator under the associated driving-environment characteristics. In at least some examples in which the vehicle is not operated by a human, a speed of a reference object may be used for training. As a non-limiting example, a vehicle driving autonomously may recognize a second vehicle driving and use the speed and relative locations of all other entities (including the autonomously driven vehicle) relative to the second vehicle as the driving training data 202.

In an example, the driving training data 202 is stored in a database stored on a disk drive or other computer-readable storage media accessible to the training computer system 206. In some examples, the driving training data 202 is stored in a relational database. In some examples, the driving training data 202 is stored in memory as pairs of driving-environment characteristics and associated speeds using a data structure capable of storing value pairs such as a linked list, hash table, or array. In various examples, such data may be encoded into a top-down multi-channel image wherein each channel of the image encodes data of the environment. Additional information may be found in U.S. patent application Ser. No. 16/151,607, as referred to above. In any number of examples described herein, the driving training data 202 may comprise a series of such data accumulated over a period of time (e.g., a series of multi-channel images, e.g., one, two, three, or more).

The training computer system 206 provides the driving training data 202 to a machine-learning system to produce a machine-learned model 208. In various examples, the training computer system 206 trains the machine-learned model 208 by providing the driving-environment characteristics in the driving training data 202 to the machine-learned model 208, and using a reward or example of the associated vehicle speed driven by the human operator. In one example, machine-learned model 208 is a universal approximator. In some implementations, the driving training data 202 is processed to filter data to exclude where the driven vehicle is not moving, or the vehicle is impeded by another vehicle. In some examples, the driving training data 202 includes data from a variety of vehicle types, and the driving training data 202 is filtered to include only those vehicle types to be controlled by the machine-learned model 208. In at least some examples, such a machine-learned model 208 comprises an artificial or deep learned neural network (such as, but not limited to, a convolutional neural network) in which the desired speed is set as a ground truth and internal parameters are adjusted based on computing a loss or cost associated with a difference between an expected outcome and the actual output and performing a gradient descent.

In an example, once the training computer system 206 has finished training the machine-learned mode 208, the machine-learned model 208 is capable of taking driving-environment characteristics and producing a speed that would likely be chosen by a human operator. The speed suggested by the machine-learned model 208 may be used as the desired speed for the vehicle or may be processed in combination with other data to produce a final desired speed for the vehicle. For example, the vehicle speed suggested by the machine-learned model 208 may be limited by the statutory speed limit. In another example, the speed suggested by the machine-learned model 208 may be further limited by the vehicle control system based at least in part on the capability of the vehicle. In at least some examples, the statutory speed limit may be a threshold over which the vehicle is not allowed to proceed. For example, despite traffic flowing faster than a posted speed limit (and a corresponding desired speed output of greater than such a speed limit), the vehicle may be capped by such a limit.

In various examples, the machine-learned model 208 can be a neural network or learning system that is trained using the driving training data 202. In some examples, the machine-learned model 208 can be a function generated by fitting the driving training data 202 to a curve using regression methods.

FIG. 3 illustrates an example of a process 300 to generate a machine-learned model that outputs a desired vehicle speed given a set of driving-environment characteristics. In at least one example, the machine learned model may be trained based on a computer system that includes storage and memory storing instructions that, as a result of being executed by one or more processors of the machine-learning system, cause the system to perform the process illustrated in FIG. 3. The machine-learning computer system implements a machine-learning model and manages the training of the machine-learning model using data that converts driving-environment characteristics into a desired speed.

The process 300 begins at block 302, with a training computer system obtaining driving data for vehicles driven by human operators. In some examples, the driving data includes data collected from instrumented vehicles. In another example, driving data includes data produced by human operators operating a simulated vehicle. In yet another example, the driving data includes data observed by a vehicle monitoring system such as a traffic camera or traffic signal camera. In yet another example, driving data is collected from traffic monitoring applications originating from cell phone tracking or social media driving applications. In various examples, the driving data is stored on a local or remote database that is accessible to the machine-learning system.

At block 304, the machine-learning computer system processes the driving data to identify relevant training data. In some examples, the machine-learning computer system excludes driving data where the vehicle is not moving. In other examples, the machine-learning computer system excludes driving data where the speed of a particular vehicle is impeded by another vehicle or object, for example closely following another vehicle. In another example, the machine-learning computer system excludes driving data where the type of vehicle is significantly different from the vehicle of interest. The machine-learning computer system may exclude vehicles that are towing trailers, or large trucks, from the data set if the machine-learning model is being trained to determine a desired speed for a passenger car. In one implementation, the machine-learning computer system filters out driving data where the vehicle is at an intersection, traffic junction, or grid occlusion. In various examples, information regarding occlusions (e.g., as may be encoded in an occlusion grid) may be input into such a model for making a determination. As a non-limiting example, where the vehicle is unable to see (due to fog, etc.), a speed may be reduced based on the low visibility (at least as a factor).

At block 306, the machine-learning computer system samples the remaining driving data by selecting individual vehicles at particular times to be used to train the machine-learned model. At block 308, for each sample, the machine-learning computer system determines a set of driving-environment characteristics for the vehicle in question. The set of driving-environment characteristics may be any of the characteristics described above. For example, the set of driving-environment characteristics may include a statutory speed limit, lane width, a prevailing visibility, the weather condition, a number of other vehicles within a threshold distance of the vehicle, a number of other vehicles outside a threshold distance of the vehicle, a number and location of parked cars, the presence of pedestrians, the presence of bicycles or non-motorized vehicles, road curvature, and the presence of a hill. In some examples, the driving-environment characteristics may include an indication of road surface quality. For example, the driving-environment characteristics may include that the road is gravel, loose gravel, dirt, asphalt, concrete, under construction, freshly chip sealed, ice-covered, snow-covered, or freshly tarred. In one example, the driving-environment characteristics include an indication of whether the car is in a road-construction area.

In an example, at block 310, the machine-learning computer system determines, for each sample, the velocity of the vehicle associated with the sample and the driving-environment characteristics. In various examples, the velocity of the vehicle may be provided directly or indirectly within the data. The velocity associated with the vehicle can be determined, in some examples, by reading a speedometer or wheel speed sensor on the vehicle. In other examples, the velocity of the vehicle can be determined indirectly by measuring a change in the position of the vehicle and dividing by the time between position measurements. In some implementations, vehicle velocity is measured directly using radar. The velocity of other objects may be determined by combining inputs from visual tracking, radar, or LIDAR with those that measure the speed and direction of the autonomous vehicle.

At block 312, the machine-learning computer system provides the processed driving data that includes sets of driving-environment characteristics and associated vehicle speeds, to the machine-learning model. The machine-learned model is trained using this data, and after training is able to produce a desired vehicle speed when provided with a corresponding set of driving-environment characteristics measured from a vehicle being controlled. For example, an autonomous vehicle, using various cameras, ultrasonic sensors, radar, LIDAR, and other sensors uses the sensor data to synthesize a set of driving-environment characteristics for the autonomous vehicle. By providing the set of driving-environment characteristics of a trained machine-learning model, the machine-learned model is able to produce a desired vehicle speed based on the training data. In various examples, the vehicle speed produced by the machine-learned model mimics that of a human driver if the training data is comprised primarily of vehicles under human control.

In various examples, the machine-learned model, once trained, can be transferred to a vehicle-control system and used to generate human-like speed selection for the autonomous vehicle. In various examples, the speed determined by the machine-learned model may be combined with other limitations to produce a lower vehicle speed. Limiting a vehicle to a speed estimated from human-driven training improves vehicle safety by providing a more accurate speed based on a totality of environment characteristics. For example, the machine-learned model can adapt the target vehicle speed to inclement weather conditions, reduced visibility, differing coefficients of friction of the surface, etc. without the need for complex (and sometimes impossible) physical models. In addition, limiting a vehicle to a speed estimated from human-driven training data may, in various examples, make vehicle passengers and copilots more at ease when riding in a vehicle that is currently under autonomous control.

Figure 4:
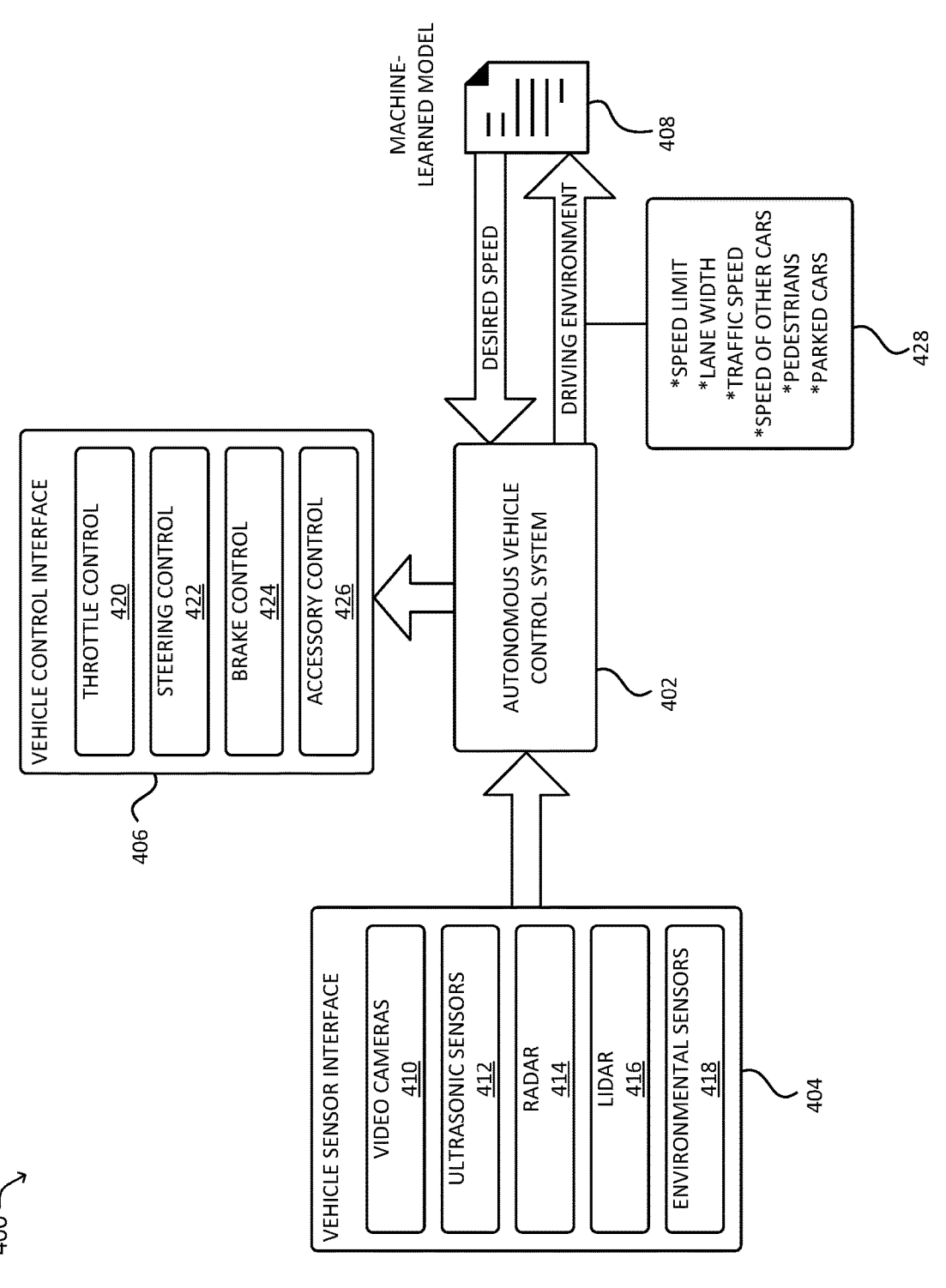
FIG. 4 illustrates an example of a vehicle control system that uses a machine-learned model to determine a desired vehicle speed.

FIG. 4 illustrates an example of a vehicle control system 400 that uses a machine-learned model to determine a desired vehicle speed. In one implementation, the vehicle control system 400 includes an autonomous vehicle control system 402, a vehicle sensor interface 404, a vehicle control interface 406, and a machine-learned model 408. The autonomous vehicle control system 402 is a computer system containing one or more processors, and memory containing instructions that, as a result of being executed by the one or more processors, cause the autonomous vehicle control system 402 to acquire sensor data via the vehicle sensor interface 404, perform various control operations, and output control signals to the autonomous vehicle via the vehicle control interface 406. In some examples, the autonomous vehicle control system 402 is a microprocessor, GPU, processor, or embedded logic circuit. Some implementations of the autonomous vehicle control system 402 may use a processor such as the one described and shown in FIG. 7.

In various examples, the autonomous vehicle control system 402 may be used as part of a fully autonomous or partially autonomous vehicle control system. For example, the autonomous vehicle control system 402 may provide speed control to a vehicle while the human operator provides directional control. In another example, the autonomous vehicle control system 402 may provide autonomous control to the vehicle, the human operator being present to take over in certain complex driving situations. In various examples, the autonomous vehicle control system 402 may be used to control a passenger vehicle, a truck, a semi-tractor trailer, a forklift, a delivery van, a tractor, an agricultural vehicle, or a mining truck. In some implementations, the training data includes an identification of vehicle type and the model produces a target speed that is appropriate for the identified vehicle type.

In various examples, the vehicle sensor interface 404 includes electronic hardware that interfaces the autonomous vehicle control system 402 with a set of sensors that are connected directly or indirectly to the vehicle. In one example, the vehicle sensor interface 404 includes a set of video cameras 410, a set of ultrasonic sensors 412, a radar sensor 414, a LIDAR sensor 416, and one or more environmental sensors 418. The set of video cameras 410 may include color, black and white, or infrared cameras. Cameras may be positioned on the front, backsides, top or bottom of the vehicle. In some examples, visible and infrared cameras may be positioned with overlapping coverage. The set of ultrasonic sensors 412 may include parking sensors and also near-object detection sensors. In some examples, the radar sensor 414 is a forward-looking radar. In other examples, the radar sensor 414 provides a view over an arc or a full circle around the vehicle. The LIDAR sensor 416 indicates a distance to objects around the vehicle.

In various examples the one or more environmental sensors 418 may include atmospheric sensors such as an exterior temperature sensor, a moisture sensor, a humidity sensor, a wind sensor, an atmospheric pressure sensor, and an altimeter. In some examples, the one or more environmental sensors 418 may include one or more services accessed remotely by the autonomous vehicle control system 402. For example, the one or more environmental sensors 418 may include a weather service accessed by the autonomous vehicle control system via a wireless network such as a cellular network. In some examples, the one or more environmental sensors 418 may include a road status service that indicates road construction, road revisions, accidents, road blockages, or other road status information provided by a governmental authority or other entity.

In an example, the vehicle control interface 406 contains electromechanical interfaces that allow the autonomous vehicle control system 402 to control the autonomous vehicle. In one example, the vehicle control interface 406 includes a throttle control 420, the steering control 422, a brake control 424, and an accessory control 426. In various examples, the autonomous vehicle control system 402 controls various aspects of the vehicle by an electrical interface that converts digital control signals to higher power electrical signals that can be used to drive stepper motors, actuators, solenoids, or electromotive devices which are coupled to mechanical controls of the vehicle. For example, in one implementation the throttle control 420 is implemented using a linear actuator and position sensor coupled to the throttle control of the engine of the vehicle. In another example, the throttle control 420 is implemented by an electrical signal sent to an electric motor controller of an electric vehicle. In an example, the steering control 422 is implemented using a stepper motor that drives the steering of the vehicle via a rack and pinion mechanism. In an example, the brake control 424 is an electric actuator that operates a hydraulic piston to pressurize the hydraulic brake system. In some examples, the brake control 424 is linked to an electronic brake controller that includes regenerative braking. In some examples, the brake control 424 includes multistage breaking that includes air brakes, Jake brakes, regenerative braking, trailer brakes, and friction braking. In an example, the accessory control 426 includes additional vehicle controls such as a battery charging system for an electric vehicle, a cooling system, a tire pressure monitoring system, or a fuel economy monitoring system. For example, the accessory control 426 may include a battery monitoring system that indicates the charge level and temperature of an electric vehicle battery pack.

In various examples, the autonomous vehicle control system 402 retrieves sensor data from the various sensors on the vehicle sensor interface 404. The sensor data is processed by the autonomous vehicle control system 402 to produce a set of driving-environment characteristics 428. In some examples, the set of driving-environment characteristics match the set of characteristics used to train the machine-learned model 408. The autonomous vehicle control system 402 provides the set of driving-environment characteristics 428 to the machine-learned model 408. In response, the machine-learned model 408 calculates a desired speed and provides the desired speed to the autonomous vehicle control system 402. The autonomous vehicle control system 402 may, in some examples, combine the desired speed produced by the machine-learned model 408 with other limitations such as a statutory speed limit, physical speed limit, or heuristically calculated speed limit to determine a final desired speed for the autonomous vehicle. Based at least in part on the desired speed produced by the machine-learned model 408, the autonomous vehicle system controls the autonomous vehicle via the vehicle control interface 406. For example, if the desired speed is faster than the speed currently sensed by the vehicle sensor interface 404, the autonomous vehicle control system 402 may increase the throttle control 420 or decrease the brake control 424 (if currently applied). In another example, if the desired speed is slower than the speed currently sensed by the vehicle sensor interface 404, the autonomous vehicle control system 402 may use the vehicle control interface 462 to decrease the throttle control 420 or increase the brake control 424 (if the throttle is closed).

FIG. 5 illustrates an example of a process 500 that, as a result of being performed by an autonomous-vehicle control system, controls a vehicle speed in accordance with a desired speed produced by a machine-learned model. In some examples, the autonomous-vehicle control system is a system as shown in FIG. 4 and the associated description. In some examples, the process begins at block 502 with the autonomous-vehicle control system obtaining sensor data from sensors of the autonomous vehicle. In some examples, sensor data is acquired periodically according to a sampling rate. In other examples, sensor data is acquired in response to the receipt of a signal via the sensor. In yet other examples, sensor data is acquired in response to a change in a signal received at a sensor.

In an example, at block 504, the autonomous-vehicle control system processes the sensor data to determine a set of driving-environment characteristics for the vehicle. In an example, the driving-environment characteristics correspond to a set of input parameters to a machine-learned model. In some examples, some driving-environment characteristics may be determined directly such as statutory speed, road curvature, and road width (such as from map data associated with the position in the environment). In other examples, certain driving-environment characteristics are calculated indirectly from sensor signals such as the location of parked vehicles, the speed of other vehicles, and lane width. Some driving-environment characteristics may require image processing such as detection of an emergency vehicle. For example, an active emergency vehicle could be detected by detecting the flashing lights on the emergency vehicle and such classification could be input into the network as another feature for determining speed (e.g., recognizing traffic slows down in the presence of such vehicles). In some examples, the autonomous-vehicle control system has access to remote data services via wireless network, and sensor data is acquired from remote services such as a weather service or a road status service.

In an example, at block 506, the autonomous-vehicle control system provides the driving-environment characteristics to the machine-learned model described elsewhere in the present application. In one example, the machine-learned model produces a desired vehicle speed based at least in part on the provided driving-environment characteristics. In another example, the machine-learned model produces a linear or angular acceleration limit for the vehicle. In yet another example, the machine-learned model produces a plurality of outputs that may include one or more of desired speed, acceleration limit, turning limit, or other control limits. In various examples, the machine-learned model may not output additional actuator commands directly, but such commands may be inferred from the output speed. As a non-limiting example, if such a model outputs a speed limit of 30 mph in an area which is designated as having a speed limit of 40 mph, all actuations may be capped (e.g., have a threshold not to meet or exceed) of 75% of their nominal threshold (e.g., 75% of max acceleration, steering angle rate, etc.). At block 508, the autonomous-vehicle control system uses the desired speed provided by the machine-learned model to determine the target speed for the vehicle. In some examples, the desired speed provided by the machine-learned model is used as a limitation imposed on the heuristic speed. A heuristic speed may, in some examples, be calculated based on the sensor acuity of the autonomous vehicle, the capabilities of the vehicle being controlled, and the accuracy of the control system. In some examples, the target vehicle speed may be the lower of the desired speed produced by the machine-learned model, a heuristic speed, and a statutory speed limit.

In some examples, at block 510 the autonomous-vehicle control system adjusts the vehicle speed to the target speed determined above. Adjustments to vehicle speed may be made gradually. For example, in some implementations, filtering may be applied to the current vehicle speed based on the target speed using a low-pass filter. In another example, change in velocity is limited to one mile-per-hour per second. Vehicle speed may be adjusted by adjusting throttle, braking, regenerative braking, engine braking, friction braking, or current to an electric motor of an electric vehicle. Changes to vehicle speed may be processed in a way that does not change speed unless the difference between the target speed and the current speed exceeds a threshold amount.

FIG. 6 illustrates an example of a process 600 that, as a result of being performed by an autonomous-vehicle control system, determines a preferred vehicle speed based at least in part on a speed produced by a machine-learned model. In some examples, the process 600 begins at block 602 with an autonomous-vehicle control system generating a desired speed using a machine-learned model. In some examples, the desired speed is determined using the process shown in FIG. 5 and the associated description. At block 602, a target speed for the autonomous vehicle is set to the desired speed determined by the machine-learned model.

At decision block 604, the autonomous-vehicle control system determines a statutory speed limit. In some examples, the statutory speed limit is determined by determining the position of the vehicle using a global positioning system, identifying a roadway on which the vehicle is traveling using a navigation database, and then looking up the speed limit for the roadway in the navigation database (e.g., as may be encoded in map data). In some examples, the statutory speed limit is determined by using a camera on the autonomous vehicle to capture images of road signs, and identifying speed limit signs from the captured images. If the desired speed produced by the machine-learned model is greater than the statutory speed limit, execution advances to block 606 and the target speed of the vehicle is set to the statutory speed limit. Execution then advances to decision block 608.

At decision block 608, the autonomous-vehicle control system determines the speed capability of the vehicle being controlled. In some examples, the speed capability is based on the horsepower of the vehicle, the weight of the vehicle, the weight of any load carried by the vehicle, the weight of any load towed by the vehicle, the ambient air temperature, and temperatures of internal vehicle components such as battery temperature, motor temperature, engine temperature, coolant temperature, transmission temperature. In some examples, brake temperature and brake capacity are factors that limit the vehicle speed capability. If the vehicle speed capability is less than the target speed, execution advances to block 610 and the target speed is set to the vehicle speed capability. Execution then advances to decision block 612.

At decision block 612, the autonomous-vehicle control system determines a heuristic speed limit. In some examples, the heuristic speed limit is calculated as described above in the application. In other examples, the heuristic speed limit is determined based on a formula that includes road traction, braking capability, and sensor acuity of the autonomous vehicle. If the heuristic speed limit is less than the target speed limit, execution advances to block 614 and the target speed is set to the heuristic speed limit. Execution then advances to block 616. At block 616, the autonomous-vehicle control system controls the autonomous vehicle in accordance with the target speed.

FIG. 7 illustrates an example of autonomous vehicle components 700 that can be used in an architecture of an autonomous vehicle. For example, the autonomous vehicle control system above may be implemented as the autonomous vehicle operation system 702 described below. The autonomous vehicle might be characterized as having an autonomous vehicle operation system 702, coupled to various controllers, which in turn are coupled to various components of the autonomous vehicle to handle locomotion, power management, etc. Elements of the autonomous vehicle operation system 702 provide for a computational system for implementing object identification and environment analysis, as described herein. These elements might find use in other applications outside of autonomous vehicles.

The architecture 700 may specify one or more computer system(s) including various hardware, software, firmware, etc., to implement aspects of the systems, methods, and apparatuses described herein. For example, the autonomous vehicle operation system 702 may include a surroundings analysis system 703 and other components usable for various aspects of an autonomous vehicle. The surroundings analysis system 703 might be used to take in information that the autonomous vehicle operation system 702 might use to operate controllers for a motor, steering, object avoidance, etc.

The surroundings analysis system 703 might be organized as a plurality of subsystems to simplify implementation. In some examples, the subsystems are implemented independently, while in other examples, more than one subsystem are integrated together in part or in full. The subsystems might include a LIDAR subsystem, a camera subsystem, a radar subsystem, a sonar subsystem, a perception and prediction subsystem 712, a localization and mapping subsystem 714, a tracking subsystem 726, a planning subsystem 728, a sensor calibration subsystem 730, and possibly other subsystems 734. The perception and prediction subsystem 712 performs object detection, segmentation, and classification of objects from sensor data of various types including LIDAR, radar, and visual images.

A given subsystem might be implemented with program code or hardware for communicating with other subsystems, to receive inputs and provide outputs. Some of the inputs might be from sensors. In some descriptions herein, for readability, a subsystem might be described as including sensors from which the subsystem obtains data or signals and/or emitters to which the subsystem outputs data or signals. For example, a sonar subsystem might be described as having an ultrasonic sensor or might be described as receiving signals from an ultrasonic sensor. As another example, a camera subsystem might be described has having a camera and a display or might be described as receiving signals or data from a camera and sending signals or data to a display.

Although not shown in FIG. 7, it should be understood that communication among subsystems can be provided for as needed. A given subsystem might communicate with another subsystem by sending data over some channel directly to the other subsystem, or the surroundings analysis system 703 might comprise a bus subsystem or communication infrastructure over which subsystems can communicate by passing data and/or signals there between. The surroundings analysis system 703 might also be configured to receive external data and to communicate information to outside the surroundings analysis system 703.

A given subsystem might have some of its own computational processing, which might be performed by hardware dedicated to that given subsystem or might be performed by a processor or circuit assigned to perform computation of that subsystem, as might be the case where the subsystem is implemented entirely in software and is executed by one or more processor(s) 736 using a memory 738, such as a program code memory and data storage memory. The memory might be for temporary storage of variables and data, such as RAM, and memory for permanent storage (i.e., data that persists without needing refresh, power, etc., for some period of life), and should be implied where indicated even if not explicitly mentioned. For example, where a subsystem is described as operating on a database or storing data, there would be some form of memory for storing data in electronically readable form. In some cases, the database or data storage in memory is not specific and internal to one subsystem. In those cases, the memory is accessible by more than one subsystem. For example, one subsystem might create records based on sensor data obtained by that subsystem and write those records to a database or other data structure and, in turn, another subsystem can read and use that data. Where a subsystem is implemented in software, the subsystem might include program code coupled to a processor specific to that subsystem or a more general program code memory and processor.

In some instances, the surroundings analysis system 703 is employed in an autonomous vehicle. In some instances, the surroundings analysis system 703 may provide perception and planning functionality for the autonomous vehicle. In general, the surroundings analysis system 703 may provide for LIDAR perception, radar perception, vision (camera) perception, acoustic perception, segmentation and classification, tracking and fusion, and prediction/planning, as well as interfacing to other controllers, such as a drive controller, a power controller, an environmental controller, and a communications controller.

The autonomous vehicle operation system 702 may include a road navigation system 742, a manifest manager 744, and an audit/fault logger 746. The autonomous vehicle operation system 702 might also include or interface to various sensors 750 and emitters 752.

The autonomous vehicle operation system 702 might interface to a drive controller 770 that interacts with motors 780, steering 782, brakes 784, and a suspension 786; a power controller 772 that interacts with a battery 788 and an inverter/charger 790; an environmental controller 774 that interacts with heating, venting, air conditioning (HVAC) components 792 and lighting 794; and a communications controller 776 that handles communications between the autonomous vehicle, devices in use with the autonomous vehicle, and external devices, such as via a network, a cellular channel, or a Wi-Fi channel 796. A combination of autonomous vehicle operation system 702, the controllers, and the vehicle components installed in an autonomous vehicle can provide for a vehicle that is able to navigate safely without constant human intervention.

The autonomous vehicle operation system 702 may include any number or type of sensors suitable for use in an autonomous vehicle beyond those illustrated. The various sensors 750 may include but are not limited to ultrasonic transducers, wheel encoders, environmental sensors, microphones, inertial measurement unit(s) (IMU), accelerometers, gyroscopes, magnetometers, temperature sensors, humidity sensors, light sensors, global positioning system (GPS) sensors, pressure sensors, location sensors, etc.

A LIDAR subsystem may include one or more LIDAR sensors to capture LIDAR data for segmentation, as described herein, and may comprise any one or more depth sensors as described in detail herein. In some instances, the LIDAR subsystem 704 may include functionality to combine or synthesize LIDAR data from a plurality of LIDAR sensors to generate a meta spin of LIDAR data, which may refer to LIDAR data based on multiple LIDAR sensors. In the case of a meta spin of LIDAR data, the LIDAR subsystem may include functionality to determine a virtual origin of the meta spin data (e.g., a coordinate reference frame common to all LIDAR sensors) and perform a data transformation such that LIDAR data from each of the one or more LIDAR sensors is expressed with respect to the virtual origin. As may be understood in the context of this disclosure, the LIDAR subsystem may capture data and may transmit datasets to other subsystems for subsequent processing.

A camera subsystem may include or interface to one or more camera sensors to capture vision data for image segmentation and/or classification. The camera subsystem may include any number and type of camera sensors. For example, the camera subsystem may include any color cameras, monochrome cameras, depth cameras, RGB-D cameras, stereo cameras, infrared (IR) cameras, ultraviolet (UV) cameras, etc. As may be understood in the context of this disclosure, the camera subsystem may capture data and may transmit datasets to the other subsystems for subsequent processing. For example, data from the camera subsystem may be included as one or more channels of a multi-channel image that is processed as such by another subsystem.

A radar subsystem may include one or more radar sensors to capture range, angle, and/or velocity of objects in an environment. As may be understood in the context of this disclosure, the radar subsystem may capture data and may transmit datasets to other subsystems for subsequent processing. For example, data from the radar subsystem may be included as one or more channels of a multi-channel image provided to another subsystem.

A sonar subsystem may include or interface to one or more speakers or sound emitters and one or more microphones (such as a microphone array) to capture acoustic information from objects in an environment. Additionally, or in the alternative, such a sonar subsystem may comprise various ultrasonic transducers. For example, the sonar subsystem may cause an ultrasonic transducer to emit pulses of sound and may listen for echoes to determine a position and/or motion information associated with objects in the environment. As may be understood in the context of this disclosure, the sonar subsystem may capture data and may transmit datasets to the other subsystems for subsequent processing. For example, another subsystem can fuse data obtained from the sonar subsystem with data obtained from the LIDAR subsystem, in order to more accurately segment objects and/or to determine information about the objects, or for other purposes.

In some instances, the LIDAR subsystem, the camera subsystem, the radar subsystem, and/or the sonar subsystem may provide one or more datasets for other subsystems of the surroundings analysis system for combining and/or synthesizing the data.

The surroundings analysis system 703 may further include storage for simulated data that has been generated by a computer simulation algorithm, for use in part in testing. In some instances, the simulated data may include any type of simulated data, such as camera data, LIDAR data, radar data, sonar data, inertial data, GPS data, etc. In some instances, surroundings analysis system 703 can modify, transform, and/or perform the converting operations described herein on the simulated data for verifying an operation and/or for training machine learning algorithms, as described herein. For example, to test some functionality in a laboratory setting, simulated sensor data/signals might be supplied to subsystems as if it were actual sensor data, to test performance of some subsystems. In some implementations, simulated data can include messages, events, and system alerts that are sent to the autonomous vehicle operation system 702.

The localization and mapping subsystem 714 may include functionality to convert or map data to a voxel map. For example, the localization and mapping subsystem 714 can receive LIDAR data, camera data, radar data, sonar data, etc., and map, convert, or associate individual data points to a voxel map representing a three-dimensional space in an environment. A voxel space is a logical representation of a three-dimensional environment, such as the space surrounding an autonomous vehicle, that is represented as discrete small volumes, e.g., voxels. A voxel map provides data or values for respective voxels in the voxel space. As a representation of the three-dimensional environment, the voxel map can be stored in memory and manipulated by a processor.

In some instances, the localization and mapping subsystem 714 can define dimensions of a voxel space, including a length, width, and height of the voxel space. Further, the localization and mapping subsystem 714 may determine a size of individual voxels. In some instances, voxels may be a uniform size and shape throughout the voxel space, while in some instances, a size and/or density of voxels may vary based on a relative location in the voxel space. For example, a size of a voxel may increase or decrease in proportion to a distance of the voxel from an origin or center of the voxel space. Additionally, or in the alternative, such a localization and mapping subsystem 714 may comprise a transformation between a virtual origin and an origin of the voxel space. In some instances, the localization and mapping subsystem 714 may include functionality to generate a sparse voxel space wherein voxels that do not include data, or that include an amount of data below a data threshold, need not be present in the voxel map and the values of those voxels can be assumed or ignored. In such an instance, the voxel map may be organized as an octomap, a voxel hashing, or the like. In some instances, the localization and mapping subsystem 714 may include functionality to reduce an amount of noise in the data of a voxel map or the data used to generate the voxel map by filtering data as it is mapped to the voxel space and stored in the voxel map. For example, filtering may include removing data below a threshold amount of data per voxel (e.g., a number of LIDAR data points associated with a voxel) or over a predetermined number of voxels (e.g., a number of LIDAR data points associated with a number of proximate voxels). In some instances, the localization and mapping subsystem 714 can update a voxel map as data is gathered over time, and/or in response to an autonomous vehicle navigating within the real-world environment to which the voxel space corresponds. For example, the localization and mapping subsystem 714 may add data and/or discard data from the voxel map as an autonomous vehicle navigates in an environment.

In some instances, the localization and mapping subsystem 714 can initialize the voxel map and other voxel space parameters, such as voxel size, orientation, and extent, treating the initial voxel map as representing empty space, and the localization and mapping subsystem 714 can build up representations of objects as LIDAR data is captured over time. In other instances, the localization and mapping subsystem 714 can initialize the voxel map and voxel space parameters using global map data.

The tracking subsystem 726 may include functionality to receive an indication of one or more dynamic objects and perform additional processing in order to track the objects. For example, the tracking subsystem 726 may determine a velocity of a dynamic object and/or may determine and store a trajectory of the dynamic object over time. In some instances, the tracking subsystem 726 may be programmed to perform a prediction algorithm that may predict a path of the object to be tracked based on previous motion of the object. In various examples, the tracking subsystem 726 performs data association that one object is the same as a previously detected object. In some examples, the tracking subsystem maintains extents, computes velocities, and determines orientations of object.

The planning subsystem 728 may include functionality to receive segmented data and/or indications of the ground plane, static objects, and/or dynamic objects to determine a trajectory of an autonomous vehicle. For example, the planning subsystem 728 may receive segmentation information identifying the ground plane and may generate a trajectory for the autonomous vehicle to follow.

The sensor calibration subsystem 730 may include functionality to calibrate one or more sensors 750 based at least in part on the segmentation information determined with respect to an environment. For example, while sensor data from the LIDAR, camera, radar, and/or sonar sensors or subsystems may be used to estimate a location and/or orientation (e.g., using simultaneous localization and mapping (SLAM)), an autonomous vehicle may also include additional sensors, such as an inertial measurement unit (IMU) and/or a GPS unit, for determining a location of the autonomous vehicle in an environment. In some instances, the IMU may indicate that the autonomous vehicle is in a first location, while an analysis of the LIDAR data discussed herein indicates that the vehicle is in a second location different from the first location. The sensor calibration subsystem 730 may determine a difference in the locations and may adjust or calibrate one more sensors to update a location of the autonomous vehicle or one or more sensor intrinsic characteristics or extrinsic characteristics.

For example, characteristics of a camera sensor may include focal length, image center, distortion parameters, shutter speed, resolution, and spectrum. Characteristics of a radar may include output power and input sensitivity. Characteristics of a LIDAR sensor may include resolution and sampling rate. An exemplary neural network might pass input data through a series of connected layers to produce an output. One example of a neural network may include a convolutional neural network, or CNN. Each layer in a CNN may also comprise another CNN, or may comprise a number of layers. As may be understood in the context of this disclosure, a neural network may utilize machine learning, which may refer to a broad class of such algorithms in which an output is generated based on learned parameters.

Although discussed in the context of neural networks, many types of machine learning may be used consistent with this disclosure. For example, machine learning algorithms may include but are not limited to regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), dimensionality reduction algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), ensemble algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

The environment depicted in FIG. 7 might be implemented with one or more computer systems that comprise storage, one or more processor(s), memory, and possibly an operating system.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary environment and computerized system for implementing the systems and methods might include a processor or computer system that can be configured to particularly perform some or all of the methods described herein. In some examples, the methods can be partially or fully automated by one or more computers or processors. The systems and methods described herein may be implemented using a combination of any of hardware, firmware, and/or software. The present systems and methods described herein (or any part(s) or function(s) thereof) may be implemented using hardware, software, firmware, or a combination thereof and may be implemented in one or more computer systems or other processing systems. In some examples, the illustrated system elements could be combined into a single hardware device or separated into multiple hardware devices. If multiple hardware devices are used, the hardware devices could be physically located proximate to or remotely from each other. The examples of the methods described and illustrated are intended to be illustrative and not to be limiting. For example, some or all of the steps of the methods can be combined, rearranged, and/or omitted in different examples.

In one example, the systems and methods described herein may be directed toward one or more computer systems capable of carrying out the functionality described herein. Example computing devices may be but are not limited to a personal computer (PC) system running any operating system such as but not limited to OS X™, iOS™, Linux™, Android™, and Microsoft™ Windows™. However, the systems and methods described herein may not be limited to these platforms. Instead, the systems and methods described herein may be implemented on any appropriate computer system running any appropriate operating system. Other components of the systems and methods described herein, such as but not limited to a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to a communications bus, cross-over bar, or network, etc. The processes and processors need not be located at the same physical locations. In other words, processes can be executed at one or more geographically distant processors over, for example, a LAN or WAN connection. Computing devices may include a display interface that may forward graphics, text, and other data from the communication infrastructure for display on a display unit.

The computer system may also include but is not limited to a main memory, random access memory (RAM), and a secondary memory, etc. The secondary memory may include, for example, a hard disk drive and/or a removable storage drive, such as a compact disc drive CD-ROM, etc. The removable storage drive may read from and/or be written to a removable storage unit. As may be appreciated, the removable storage unit may include a computer-usable storage medium having stored therein computer software and/or data. In some examples, a machine-accessible medium may refer to any storage device used for storing data accessible by a computer. Examples of a machine-accessible medium may include, e.g., but are not limited to a magnetic hard disk; a floppy disk; an optical disk, like a compact disc read-only memory (CD-ROM) or a digital versatile disc (DVD); a magnetic tape; and/or a memory chip, etc.

The processor may also include or be operatively coupled to communicate with one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits), or FPGAs (field programmable gate arrays).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some examples, the processing system may use object-oriented programming and may store data in objects. In these examples, the processing system may use an object-relational mapper (ORM) to store the data objects in a relational database. The systems and methods described herein can be implemented using any number of physical data models. In one example, a relational database management system (RDBMS) can be used. In those examples, tables in the RDBMS can include columns that represent coordinates. The tables can have pre-defined relationships between them. The tables can also have adjuncts associated with the coordinates.

In alternative examples, secondary memory may include other similar devices for allowing computer programs or other instructions to be loaded into a computer system. Such devices may include, for example, a removable storage unit and an interface. Examples of such may include a program cartridge and cartridge interface (such as, e.g., but not limited to those found in video game devices), a removable memory chip (such as, e.g., but not limited to an erasable programmable read-only memory (EPROM), or programmable read-only memory (PROM) and associated socket), and other removable storage units and interfaces, which may allow software and data to be transferred from the removable storage unit to a computer system.

The computing device may also include an input device such as but not limited to a voice input device such as a microphone, touch screens, gesture-recognition devices such as cameras, other natural user interfaces, a mouse or other pointing device such as a digitizer, and a keyboard or other data entry device. The computing device may also include output devices such as but not limited to a display and a display interface. The computing device may include input/output (I/O) devices such as but not limited to a communications interface, cable and communications path, etc. These devices may include but are not limited to a network interface card and modems. Communications interface(s) may allow software and data to be transferred between a computer system and one or more external devices.

In one or more examples, the computing device may be operatively coupled to an automotive system. Such automotive system may be either manually operated, semi-autonomous, or fully autonomous. In such an example, input and output devices may include one or more image-capture devices, controllers, microcontrollers, and/or other processors to control automotive functions such as but not limited to acceleration, braking, and steering. Further, communication infrastructure in such examples may also include a Controller Area Network (CAN) bus.

In one or more examples, the computing device may be operatively coupled to any machine-based vision system. For example, such machine-based vision systems include but are not limited to manually operated, semi-autonomous or fully autonomous industrial or agricultural robots, household robots, inspection systems, security systems, etc. That is, the examples described herein are not limited to one particular context and may be applicable to any application utilizing machine vision.

In one or more examples, the present examples can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used. Operational commands (teleoperations) may be received by the system via cellular, infrared, radio, or wireless networking.

An exemplary computer and/or telecommunications network environment in accordance with the present examples may include nodes which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between the network and the outside world and may incorporate a collection of sub-networks.

In an example, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the examples include computers (such as personal computers, workstations, servers, or mainframes), handheld wireless devices and wireline devices (such as personal digital assistants (PDAs), modem cell phones with processing capability, wireless email devices including Black-Berry™ devices), document-processing devices (such as scanners, printers, facsimile machines, or multifunction document machines), or complex entities (such as local-area networks or wide-area networks) to which are connected a collection of processors, as described. For example, in the context of the present disclosure, a node itself can be a wide-area network (WAN), a local-area network (LAN), a private network (such as a Virtual Private Network (VPN)), or a collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present examples, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Examples of the present disclosure may include apparatuses for performing the operations herein. An apparatus may be specially constructed for the desired purposes, or it may comprise a general-purpose device selectively activated or reconfigured by a program stored in the device.

In one or more examples, the present examples are embodied in machine-executable instructions. The instructions can be used to cause a processing device, for example, a general purpose or special-purpose processor which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the examples can include a machine-readable medium having instructions stored on it. The instructions can be used to program any processor or processors (or other electronic devices) to perform a process or method according to the present examples. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection), and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device such as an LCD (liquid crystal display) or another type of monitor for displaying information to the user, and a keyboard and an input device such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages including compiled or interpreted languages, and can be deployed in any form including as a stand-alone program or as a subsystem, component, subroutine, or other unit suitable for use in a computing environment. The software can include but is not limited to firmware, resident software, microcode, etc. Protocols such as SOAP/HTTP may be used in implementing interfaces between programming subsystems. The components and functionality described herein may be implemented on any desktop operating system executing in a virtualized or non-virtualized environment, using any programming language suitable for software development, including but not limited to different versions of Microsoft Windows™, Apple™ Mac™, iOS™ Unix™/X-Windows™, Linux™ VMS™, Android, QNX, etc. The system could be implemented using a web application framework such as Ruby on Rails.

Suitable processors for the execution of a program of instructions include but are not limited to general and special purpose microprocessors and the sole processor or one of multiple processors or cores of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, subsystems, and methods described herein can be implemented using any combination of software or hardware elements. The systems, subsystems, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more examples of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to a removable storage drive, and/or a hard disk installed in a hard disk drive. These computer program products may provide software to computer systems. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrases "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

An algorithm may generally be considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes for carrying out instructions in sequence or in parallel, continuously or intermittently. The terms "system" and "method" are used herein interchangeably insofar as the system may embody one or more methods, and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results. In some examples, operations shown may be performed in parallel and substantially simultaneously. In general, although a sequence of blocks may be shown, not all steps may be required to perform the process shown.

Although the discussion above sets forth example implementations of the described techniques, other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example Clauses

Embodiments of the disclosure can be described in view of the following clauses:

1. A method, comprising: receiving, from a sensor on an autonomous vehicle, sensor data relating to a driving environment of the autonomous vehicle; determining, based at least in part on the sensor data, driving-environment characteristics of the driving environment; inputting the driving-environment characteristics into a machine-learned model trained to determine a speed using training data collected from vehicles driven by human drivers; receiving, from the machine-learned model, a target speed for the autonomous vehicle; determining based at least in part on the sensor data and the target speed, a trajectory for the autonomous vehicle; and controlling the autonomous vehicle in accordance with the trajectory.

2. The method of clause 1, wherein the driving-environment conditions include statutory speed limit, lane width, prevailing traffic speed, or oncoming traffic speed.

3. The method of clause 1 or 2, further comprising: determining a speed limit based at least in part on performance limitations of the vehicle; and reducing the target speed in accordance with the speed limit.

4. The method of any of clauses 1 to 3, wherein the sensor includes one or more of a camera, an ultrasonic sensor, a radar sensor, a LIDAR sensor, a thermometer, a moisture sensor, a humidity sensor, or an ambient light sensor, and wherein the machine-learned model comprises a neural network having three or fewer fully connected layers.

5. A system, comprising one or more processors and physical memory storing ins ructions that, as a result of being executed by the one or more processors, cause the system to: determine, based at least in part on sensor data obtained using a sensor on the system, a set of conditions associated with a driving environment of a vehicle; provide the set of conditions to a machine-learned model to produce a target speed, the machine-learned model trained using training data generated from vehicles driven by human drivers; determine based at least in part on the sensor data and the target speed, a trajectory for the autonomous vehicle; and provide the trajectory to be used to control the vehicle.

6. The system of clause 5, wherein the set of conditions comprise: weather associated with the driving environment, a number of additional vehicles in proximity to the vehicle, one or more extents associated with the additional vehicles, one or more relative velocities associated with the additional vehicles, and a statutory speed limit associated with the driving environment determined based at least in part on map data associated with the driving environment.

7. The system of clause 5 or 6, wherein the computer-executable instructions further include instructions that, if executed, cause the one or more processors to: determine, from the sensor data, that an emergency vehicle is present; and wherein the set of conditions includes the presence of an emergency vehicle.

8. The system of any of clause 5 to 7, wherein the computer-executable instructions further include instructions that, if executed, cause the one or more processors to: determine, from the sensor data, a measure of wheel slip; and wherein the set of conditions includes a measure of vehicle traction.

9. The system of any of clause 5 to 8, wherein the computer-executable instructions further include instructions that, if executed, cause the one or more processors to: determine, from the sensor data, that a pedestrian is present by determining that the pedestrian is within a threshold distance of the path of the vehicle; and wherein the set of conditions includes the presence of a pedestrian.

10. The system of any of clause 5 to 9, wherein the set of conditions further comprises an occlusion grid that identifies areas around the vehicle that are not sensed by the vehicle.

11. The system any of clause 5 to 10, wherein the computer-executable instructions further include instructions that, if executed, cause the one or more processors to: determine that the target speed is within a threshold amount of a previous target speed; and control the vehicle based at least in part on determining that the target speed is within a threshold amount of a previous target speed.

12. The system of any of clause 5 to 11, wherein the training data includes a plurality of data samples, each sample in the plurality of data samples including a value for each condition in the set of conditions and an associated speed driven by a human driver.

13. A non-transitory computer-readable storage medium having stored thereon executable instructions that, as a result of being executed by one or more processors of a computer system, cause the computer system to perform the operations comprising: obtain sensor data from one or more sensors on a vehicle; determine, based at least in part on the sensor data, one or more parameters representative of characteristics of an environment through which the vehicle travels; determine, based at least in part on the sensor data and the parameters, a target speed using a network controlled by a machine-learned model, the machine-learned model trained using training data generated from vehicles driven by human drivers; determine based at least in part on the sensor data and the target speed, a trajectory for the vehicle; and provide the trajectory to be used to control the vehicle.

14. The non-transitory computer-readable storage medium of clause 13, wherein the network is a three-layer neural network of fully connected layers.

15. The non-transitory computer-readable storage medium of clause 13 or 14, wherein the one or more parameters comprise a quantity of vehicles traveling in the same direction, a quantity of vehicles traveling in the opposite direction, a number of parked vehicles, and map data associated with the environment.

16. The non-transitory computer-readable storage medium of any of clause 13 to 15, wherein the machine-learned model produces a linear acceleration limit for the vehicle.

17. The non-transitory computer-readable storage medium of any of clause 13 to 16, wherein the training data excludes driving scenarios where the vehicle speed is zero or the path of the vehicle is impeded by another vehicle, object, or traffic junction.

18. The non-transitory computer-readable storage medium of any of clause 13 to 17, wherein the operations further comprise limiting the speed of the vehicle to the lower of the target speed and a speed limit associated with the environment as determined based at least in part on map data.

19. The non-transitory computer-readable storage medium of any of clause 13 to 18, wherein the target speed is produces by processing a sequence of target speeds through a low-pass filter.

20. The non-transitory computer-readable storage medium of clause 19, wherein the instructions further comprise instructions that, as a result of being executed by the one or more processors, cause the computer system to: identify a vehicle type of the vehicle to the machine-learned model, wherein the one or more parameters comprise the vehicle type.

What is claimed is:

1. A method, comprising:

receiving, from a sensor on an autonomous vehicle, sensor data relating to a driving environment of the autonomous vehicle;

determining, based at least in part on the sensor data, driving-environment characteristics of the driving environment, wherein the driving-environment characteristics comprise:

a first number of additional vehicles in proximity to the autonomous vehicle and travelling in a same direction as the autonomous vehicle;

a second number of additional vehicles in proximity to the autonomous vehicle and travelling in an opposite direction relative to the autonomous vehicle;

and environmental conditions comprising one or more of a physical road condition, weather of the driving environment, or visibility;

inputting the first number of additional vehicles in the same direction, the second number of additional vehicles in the opposite direction, and the environmental conditions into a machine-learned model trained to determine a speed using training data collected from vehicles driven by human drivers;

receiving, from the machine-learned model, a target speed for the autonomous vehicle;

determining, based at least in part on the sensor data and the target speed, a trajectory for the autonomous vehicle;

determining whether the target speed is within a threshold amount of a previous target speed; and controlling the autonomous vehicle in accordance with the trajectory and based at least in part on determining that the target speed is within the threshold amount of the previous target speed.

2. The method of claim 1, wherein the driving-environment characteristics further comprise one or more of:

a volumetric boundary defining occupied space associated with the additional vehicles, a presence of roadway construction or a roadway obstruction, or a statutory speed limit associated with the driving environment determined based at least in part on map data associated with the driving environment.

3. The method of claim 1, further comprising:

determining, from the sensor data, that an emergency vehicle is present, wherein the driving-environment characteristics further comprise a presence of the emergency vehicle.

4. The method of claim 1, further comprising:

determining, from the sensor data, a measure of wheel slip, wherein the driving-environment characteristics further comprise a measure of vehicle traction.

5. A system, comprising:

a sensor;

one or more processors; and physical memory storing computer-executable instructions that, as a result of being executed by the one or more processors, cause the system to:

receive sensor data from the sensor;

determine, based at least in part on the sensor data, a plurality of conditions associated with a driving environment of a vehicle, wherein the plurality of conditions comprise:

a first number of additional vehicles in proximity to the vehicle and travelling in a same direction as the vehicle;

a second number of additional vehicles in proximity to the vehicle and travelling in an opposite direction relative to the vehicle; and environmental conditions comprising one or more of a physical road condition, weather of the driving environment, or visibility;

provide the first number of additional vehicles in the same direction, the second number of additional vehicles in the opposite direction, and the environmental conditions to a machine-learned model to produce a target speed, the machine-learned model trained using training data generated from vehicles driven by human drivers;

determine, based at least in part on the sensor data and the target speed, a trajectory for the vehicle;

determine whether the target speed is within a threshold amount of a previous target speed; and control the vehicle based at least in part on the trajectory and based at least in part on determining that the target speed is within the threshold amount of the previous target speed.

6. The system of claim 5, wherein the plurality of conditions further comprise one or more of:

a volumetric boundary defining occupied space associated with one of the first number of additional vehicles or the second number of additional vehicles, a presence of roadway construction or a roadway obstruction, or a statutory speed limit associated with the driving environment determined based at least in part on map data associated with the driving environment.

7. The system of claim 5, wherein the computer-executable instructions further include instructions that, if executed, cause the one or more processors to:

determine, from the sensor data, whether an emergency vehicle is present; and wherein the plurality of conditions includes a presence of the emergency vehicle.

8. The system of claim 5, wherein the computer-executable instructions further include instructions that, if executed, cause the one or more processors to:

determine, from the sensor data, a measure of wheel slip; and wherein the plurality of conditions includes a measure of vehicle traction.

9. The system of claim 5, wherein the computer- executable instructions further include instructions that, if executed, cause the one or more processors to:

determine, from the sensor data, whether a pedestrian is present by determining that the pedestrian is within a threshold distance of a path of the vehicle; and wherein the plurality of conditions includes a presence of the pedestrian.

10. The system of claim 5, wherein the plurality of conditions further comprises an occlusion grid that identifies areas around the vehicle that are not sensed by the vehicle.

11. The system of claim 5, wherein the training data includes a plurality of data samples, each sample in the plurality of data samples including a value for each condition in the plurality of conditions and an associated speed driven by a human driver.

12. A non-transitory computer-readable storage medium having stored thereon executable instructions that, as a result of being executed by one or more processors of a computer system, cause the computer system to perform operations comprising:

obtaining sensor data from one or more sensors on a vehicle;

determining, based at least in part on the sensor data, one or more parameters representative of characteristics of an environment through which the vehicle travels, wherein the one or more parameters represent characteristics comprising:

a first number of additional vehicles in proximity to the vehicle and travelling in a same direction as the vehicle;

a second number of additional vehicles in proximity to the vehicle and travelling in an opposite direction relative to the vehicle; and environmental conditions comprising one or more of a physical road condition, weather of the environment, or visibility;

determining, based at least in part on the sensor data and the one or more parameters, a target speed provided by a machine-learned model, the machine-learned model trained by:

receiving a sample of driving data of an individual vehicle driven by a human driver;

determining a set of the one or more parameters associated with the sample and an associated speed driven by the human driver; and inputting the associated speed, the first number of additional vehicles in the same direction, the second number of additional vehicles in the opposite direction, and the environmental conditions into the machine-learned model;

determining, based at least in part on the sensor data and the target speed, a trajectory for the vehicle; and controlling the vehicle based at least in part on the trajectory;

wherein the driving data includes a plurality of data samples, each sample in the plurality of data samples including a value for each parameter in the one or more parameters and an associated speed driven by a human driver.

13. The non-transitory computer-readable storage medium of claim 12, wherein the one or more parameters represent characteristics further comprising one or more of:

a volumetric boundary defining occupied space associated with the additional vehicles, a presence of roadway construction or a roadway obstruction, or a statutory speed limit associated with the environment determined based at least in part on map data associated with the environment.

14. The non-transitory computer-readable storage medium of claim 12, wherein the operations further comprise determining, from the sensor data, whether an emergency vehicle is present; and wherein the one or more parameters represent characteristics further comprising a presence of the emergency vehicle.

15. The non-transitory computer-readable storage medium of claim 12, wherein the operations further comprise determining, from the sensor data, a measure of wheel slip; and wherein the one or more parameters represent characteristics further comprising a measure of vehicle traction.

16. The non-transitory computer-readable storage medium of claim 12, wherein the operations further comprise determining, from the sensor data, whether a pedestrian is present by determining that the pedestrian is within a threshold distance of a path of the vehicle; and wherein the one or more parameters represent characteristics further comprising a presence of the pedestrian.

17. The non-transitory computer-readable storage medium of claim 12, wherein the one or more parameters represent characteristics further comprising an occlusion grid that identifies areas around the vehicle that are not sensed by the vehicle.

18. The non-transitory computer-readable storage medium of claim 12, wherein the operations further comprise:

determining whether the target speed is within a threshold amount of a previous target speed; and controlling the vehicle based at least in part on determining that the target speed is within the threshold amount of the previous target speed.

* * * * *